United States Patent
Erlwein et al.

(10) Patent No.: US 11,885,708 B2
(45) Date of Patent: Jan. 30, 2024

(54) METHOD FOR DETERMINING A REMAINING USEFUL LIFE OF A BEARING

(71) Applicant: SIEMENS AKTIENGESELLSCHAFT, Munich (DE)

(72) Inventors: Matthias Erlwein, Eggolsheim OT Weigelshofen (DE); Vincent Malik, Munich (DE); Christian Andreas Wolf Pozzo, Zirndorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/794,953

(22) PCT Filed: Nov. 27, 2020

(86) PCT No.: PCT/EP2020/083581
§ 371 (c)(1),
(2) Date: Jul. 22, 2022

(87) PCT Pub. No.: WO2021/148170
PCT Pub. Date: Jul. 29, 2021

(65) Prior Publication Data
US 2023/0112604 A1    Apr. 13, 2023

(30) Foreign Application Priority Data
Jan. 23, 2020   (EP) ..................................... 20153396

(51) Int. Cl.
*G01M 13/045* (2019.01)

(52) U.S. Cl.
CPC ................................ *G01M 13/045* (2013.01)

(58) Field of Classification Search
None
See application file for complete search history.

(56) References Cited

U.S. PATENT DOCUMENTS

2007/0074587 A1   4/2007   Mol et al.
2017/0108406 A1   4/2017   Thomson
(Continued)

FOREIGN PATENT DOCUMENTS

EP         1510805 A1      3/2005

OTHER PUBLICATIONS

Paweł J. Romanowicz, Fatigue Life Assessment of rolling bearings made from AISI 52100 Bearing steel, Jan. 24, 2019, National Institute of Health (Year: 2019).*

(Continued)

*Primary Examiner* — Raul J Rios Russo
*Assistant Examiner* — Carl F. R. Tchatchouang
(74) *Attorney, Agent, or Firm* — Lempia Summerfield Katz LLC

(57) ABSTRACT

A method for determining a remaining useful life of a bearing having a surface defect includes determining a defect size of the surface defect based on oscillations of the bearing. The method also includes determining, based on the defect size, at least one of the principal stresses or a contact force of the bearing caused by the surface defect. The method also includes determining the remaining useful life of the bearing based on at least one of the principal stresses and/or the contact force.

12 Claims, 5 Drawing Sheets

(56) References Cited

U.S. PATENT DOCUMENTS

2019/0250069 A1* 8/2019 Samadani ............... F16C 19/52
2022/0252104 A1* 8/2022 Nair .................... G01M 13/045
2022/0364955 A1* 11/2022 Fukui .................... G06N 20/20

OTHER PUBLICATIONS

PCT International Search Report and Written Opinion of International Searching Authority dated Mar. 15, 2021 corresponding to PCT International Application No. PCT/EP2020/083581.
Romanowicz, Paweł J., and Bogdan Szybiński. "Fatigue life assessment of rolling bearings made from AISI 52100 bearing steel." Materials 12.3 (2019): 371.

* cited by examiner

METHOD FOR DETERMINING A REMAINING USEFUL LIFE OF A BEARING

This application is the National Stage of International Application No. PCT/EP2020/083581, filed Nov. 27, 2020, which claims the benefit of European Patent Application No. EP 20153396.5, filed Jan. 23, 2020. The entire contents of these documents are hereby incorporated herein by reference.

TECHNICAL FIELD

The present embodiments relate to bearings and, more particularly, rolling bearings.

BACKGROUND

Rolling bearings are commonly and widely used subassemblies in rotary machinery systems (RMS). Rolling bearings are used in the bearing arrangements of small and precise devices as well as in large industrial machines. The elements of bearings, such as balls, rollers, or raceways are exposed to multiaxial and non-proportional low and high-cycle fatigue loadings, which are usually the source of the rolling contact fatigue (RCF).

The fatigue life of bearings depends on many factors and variables, such as the size and direction of the contact forces, the geometry and roughness of the contact surfaces, the kind of material, the operating temperature, applied lubricant, lubrication conditions, rolling speed, and sliding in the contact area. As the possible damage of the rolling bearing determines the operation of the RMS, the proper estimation of the fatigue life or loading capacity of a rolling bearing becomes a crucial task in the machine design process. Additionally, difficulties with the detection of bearing element damages at the initial stages (e.g., damage detection is possible when damage achieves a certain size) justify the fatigue life prediction of rolling bearings.

SUMMARY

A bearing in a machine will eventually fail, and the most common reason for failure is the formation of surface defects from the propagation of fatigue cracks or the removal of surface grains during operation. These defects occur due to insufficient lubrication and high contact stresses between the rolling element and the raceway of the bearing, causing spalls, dents, and pits to form on the contact surfaces.

If the remaining useful life of a bearing can be accurately predicted, the potential damage may be avoided by maintenance implementations (e.g., to a achieve a maximum lifetime and minimum maintenance costs for the rotatory machinery system).

Hence, according to a first aspect, an improved method for determining a remaining useful life of a bearing having a surface defect is provided. The method includes the act of determining a defect size of the surface defect, based on, for example, sampled oscillations of the bearing (e.g., harmonic oscillations of an inner ring and/or outer ring of the bearing). The method further includes the act of determining, based on the defect size, at least one of the principal stresses or contact force of the bearing caused by the surface defect, and determining the remaining useful life of the bearing based on at least one of the principal stresses and/or the contact force.

According to a second aspect, a method for training an artificial neural network is provided. The method includes the act of generating numerical data indicative of oscillations of a bearing (e.g., harmonic oscillations of an inner ring and/or outer ring of the bearing). The oscillations are indicative of different surface defects of the bearing. The method further includes training an artificial neural network based on the numerical data generated in order to associate oscillations with different surface defects of a bearing.

According to a third aspect, using a result of the trained artificial neural network according to the second aspect for determining the remaining useful life of a bearing is provided.

According to a fourth aspect, a method for creating a substitute model of a bearing is provided. The substitute model of the bearing serves for determining a mechanical stress or a contact force of the bearing. The method includes the act of simulating the bearing, for different surface defect sizes, based on a simulation model. The method further includes the act of creating a substitute model, where the substitute model associates (e.g., via a polynomial function) defect sizes with a principal stress or a contact force of the bearing.

According to a fifth aspect, using the substitute model of the bearing according to the fourth aspect for determining the remaining useful life of a bearing is provided.

According to a sixth aspect, a computer program for carrying out the method acts according to the first aspect and/or the fourth aspect is provided.

According to a seventh aspect, an apparatus operative to carry out any one of the method acts of the first aspect and/or the fourth aspect is provided.

DETAILED DESCRIPTION

Figure 1A:
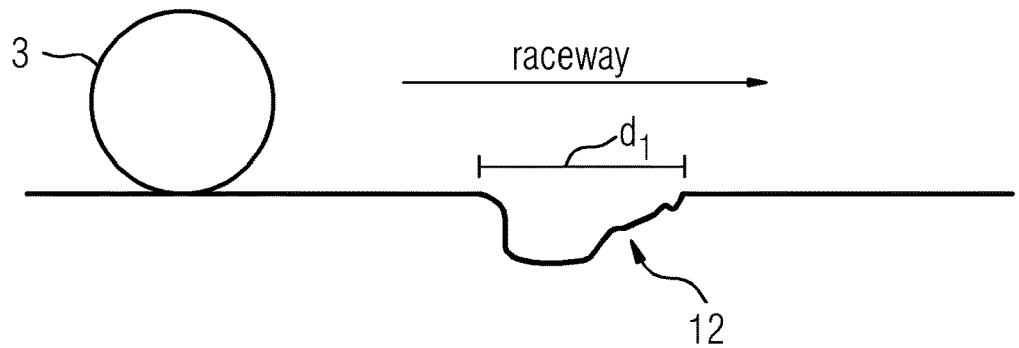
FIGS. 1a and 1b show a schematic illustration of a ball bearing having different surface defects.

The present embodiments will be further described in detail in conjunction with the accompanying drawings. The particular embodiments described herein are only used to illustrate the present invention but not to limit the present invention. Accordingly, while example embodiments of the invention are capable of various modifications and alternative forms, embodiments thereof are shown by way of example in the drawings and will herein be described in detail. There is no intent to limit example embodiments of the present invention to the particular forms disclosed. On the contrary, example embodiments are to cover all modifications, equivalents, and alternatives falling within the scope of the invention. Specific structural and functional details disclosed herein are merely representative for purposes of describing example embodiments of the present invention. This invention may, however, be embodied in many alternate forms and should not be construed as limited to only the embodiments set forth herein.

Figure 1B:
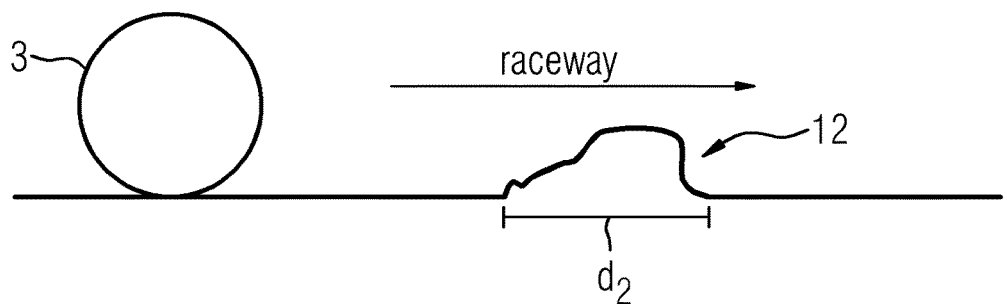

FIGS. 1a and 1b show a schematic illustration of a rolling element 3 of a bearing. Therein, balls are used as rolling-elements 3 to maintain the separation between the bearing races.

Bearings in a machine will eventually fail, and the most common reason for failure is the formation of surface defects 12, as shown in FIGS. 1a and 1b, from the propagation of fatigue cracks or the removal of surface grains during operation. These surface defects 12 occur due to insufficient lubrication and high contact stresses between the rolling element 3 and the raceway of the bearing, causing spalls, dents, and pits to form on the contact surfaces. The surface defects may be on the outer ring and/or inner ring or corresponding race(s) of the bearing. These defects 12 cause the applied load on the rolling element 3 to differ, resulting in higher than normal vibration amplitudes (cf., FIG. 3). The condition of a defective bearing may be determined by analyzing this vibration response, which may then be used for scheduling maintenance actions as will be described in greater detail in the following.

A defect size d1, d2 may be measured and/or classified according to the length and/or width of the surface defect. In addition, different edge discontinuities on the inner race and/or outer race of the roller bearing may be considered. For the purpose of simplicity, only the surface defects length will be discussed in the following. The length may be measured along the direction of the rolling element's motion (e.g., the raceway). Further, a surface defect 12 may correspond to one or more of the following: one or more spall, one or more dents, and one or more pits. These surface defects form the contact surface of the rolling element 3 and the raceway of the bearing and give rise to corresponding vibrations.

The paper "Modelling and defect size estimation of a defective bearing," Francesco Larizza, Carl Q. Howard, Steven Grainger and Wenyi Wang, Proceedings of ACOUSTICS 2018, 7-9 Nov. 2018, Adelaide, Australia proposes a model that may predict the vibration response of a defective bearing with a defect profile as an input into the model. A number of defect size estimation methods have been suggested previously for bearings with line spall-defects based on detecting the time separation between the entry and exit events from the vibration signal.

Figure 2:
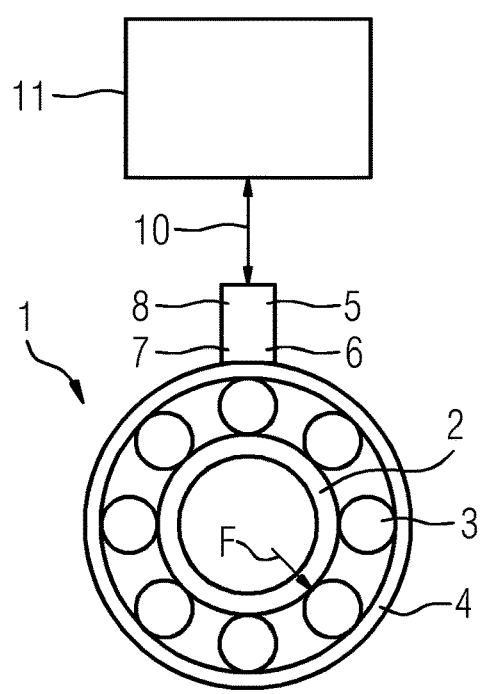
FIG. 2 shows a schematic illustration of a ball bearing.

FIG. 2 shows a bearing 1 including a bearing inner ring 2, rolling elements 3 (e.g., bearing balls), and a bearing outer ring 4. A sensor module 5 may include a vibration sensor 6. Additionally or alternatively, a sound emission sensor 7 and/or an acoustic emission sensor 8 may also be provided. The sensor module 5 is connected to an apparatus 11 for performing diagnosis, such as determining a remaining useful life of the bearing. The sensor generated signals, which are picked up by the sensor module 5 and/or the sensors 6, 7, and/or 8 are forwarded to the apparatus 11. The signals that are generated by the vibration sensor 6 are evaluated within the apparatus 11 (e.g., with the aid of vibration analysis). The vibration analysis may include a Fourier transformation of the time series sampled by the vibration sensor 6.

Figure 3:
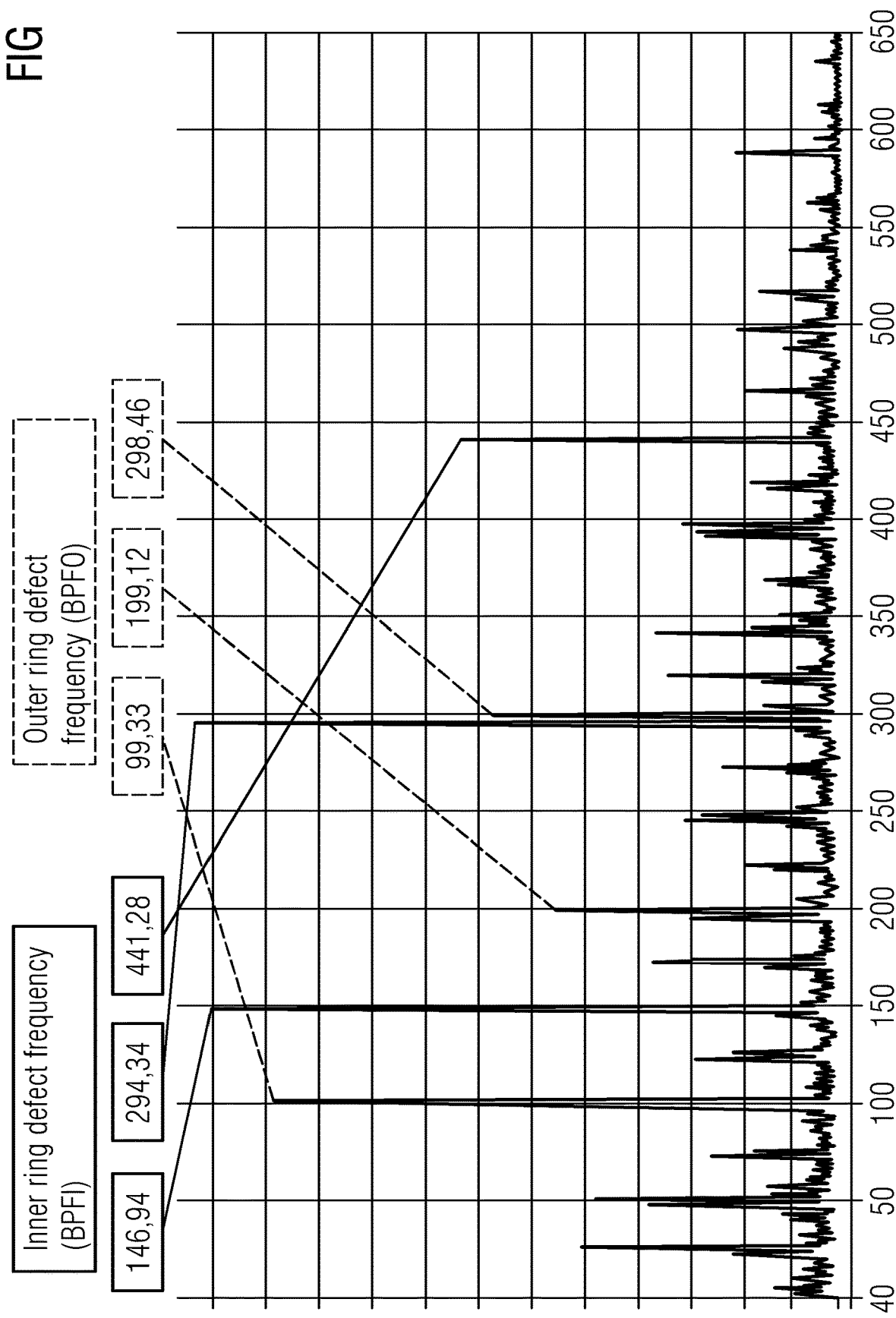
FIG. 3 is a schematic illustration of a vibration frequency spectrum of a bearing.

Turning to FIG. 3, the frequency spectrum and corresponding amplitudes of a bearing having different types of defects is shown. In case of outer ring defects (e.g., surface defects on the outer race), the spectrum is characterized by the presence of harmonic peaks of the outer race failing frequency (e.g., between 8 and 10 harmonics of the ball pass frequency of the outer ring), whereas in case of inner race defects, the spectrum shows a number of harmonic peaks of the inner race failing frequency (e.g., between 8 and 10 ball pass frequency of the inner ring harmonics). Rolling element defects (not shown) are characterized by the presence in the spectrum of harmonics of the rolling element deterioration frequency (e.g., according to the ball spin frequency).

Determining the remaining useful life (RUL) of rolling bearings is of great importance for machine operators. The exact calculation of the remaining service life of the rolling bearings, which are used in, for example, a motor, is always difficult to perform since the necessary simulation models are very complex and are only applicable for the respective motor. In addition, the effort to validate such models is very large. Existing methods calculate the remaining useful life without taking into account bearing defects that have arisen during operation of the bearing or calculate the remaining useful life up to the formation of the first defects. In practice, it is important to calculate the remaining useful life of a bearing after the formation of one or more defects and thereby consider the evolution and change of the defect size during the further operation of the bearing.

Remaining Useful Life (RUL) of an equipment or one of its components is defined as the time left until the equipment or component reaches its end of useful life. Accurate RUL estimation is beneficial to Predictive Maintenance, and Prognostics and Health Management (PHM). Data driven approaches that leverage the power of algorithms for RUL estimation using sensor and operational time series data are gaining popularity. Existing algorithms, such as linear regression, Convolutional Neural Network (CNN), Hidden Markov Models (HMMs), and Long Short-Term Memory (LSTM), have their own limitations for the RUL estimation task.

Typically, the entire service life for a new rolling bearing is calculated, and a maintenance interval is recommended based thereon. To this end, the harmonious amplitudes of the bearing are evaluated, and a damage class is determined. Then, the remaining useful life is estimated based on experience.

Figure 4:
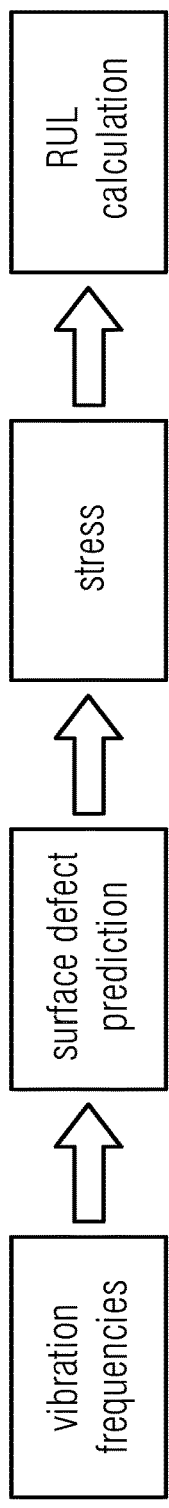
FIG. 4 shows a schematic illustration of exemplary steps for determining a remaining useful life of a bearing.

Turning to FIG. 4, exemplary acts for determining the remaining useful life of a bearing are shown. Using the harmonic frequencies' amplitudes of the vibrations of the bearing (e.g., of the inner ring and/or the outer ring) that result from damage caused by a surface defect, a size of the surface defect of the bearing is determined. For example, one or more of the following frequencies may be used: The Ball Pass Frequency Inner raceway (BPFI), the Ball Pass Frequency Outer raceway (BPFO); and/or the Fundamental Train Frequency (FTF). For example, the 1st, $2^{nd}$, and 3rd harmonics (e.g., only the 1st, 2nd, and 3rd harmonics) of the BPFI, BPFO and/or FTF may be used. In that case, the maximum amplitude of those harmonics (e.g., only the maximum amplitude of those harmonics) may be used. Higher order harmonics may be neglected or filtered out.

Subsequently, the principal stresses caused by the surface defect in the bearing are determined (e.g., taking into account the specific operating conditions of the bearing). In one embodiment, the maximum (e.g., the largest) of the principal stresses is determined and used for calculating the remaining useful life. The principal stresses are the eigenvalues of the stress tensor, and the eigen value of maximum magnitude is the maximum principal stress. Then, the remaining useful life of the bearing is calculated based on at least one of the principal stresses. To that end, a simulation model, which is, for example, based on a finite element method (FEM) or a substitute model for the FEM method, may be used in order to determine the principal stresses of the bearing. The principal stress may then be used to determine the remaining useful life based on a "high cycle fatigue" (HCF) algorithm.

Figure 5:
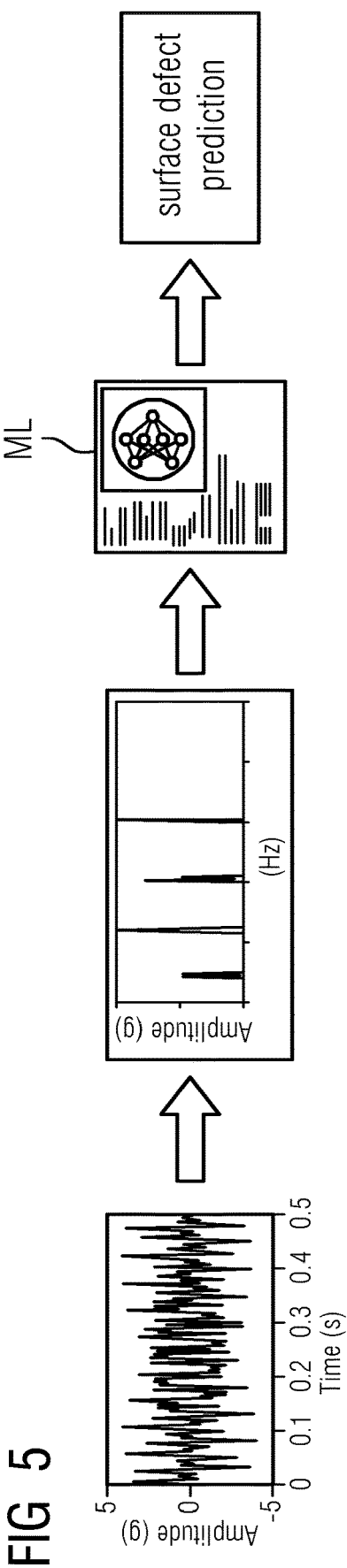
FIG. 5 shows a schematic illustration of exemplary steps for determining a surface defect size.

Turning to FIG. 5, exemplary method acts for determining the surface defect size are shown. The size of the one or more surface defects is determined with the help of a machine learning algorithm, such as a trained artificial neural network. For that purpose, an artificial neural network ML may be trained with data from the numerical simulations. For example, the hyperparameters of the artificial neural network ML, such as the number of epochs, may be set (e.g., to 500), and the learning rate may be set (e.g., to 0.2). However, other hyperparameters may be used. The training data may be obtained as a result of a simulation of a bearing having one or more surface defects, as will be described later in connection with FIG. 10. In a first act, during operation of the bearing and/or rotary machinery systems (RMS), time series data of the vibrations of the bearing are generated (e.g., by sampling the vibration sensor data, such as according to the embodiment of FIG. 2). The sampled data may be stored in a memory of a gateway such as an edge device or in a cloud-computing environment. Subsequently, the time-series data may be Fourier transformed into frequency space yielding a frequency spectrum of the vibrations of the bearing. Therein, the frequencies and amplitudes may be characteristic for specific bearing damages (e.g., whether a damage is present on the inner ring, outer ring, and/or the rolling element itself; cf. as described in connection with FIG. 3). The frequency spectrum or only part thereof may then be input into a machine learning algorithm, such as a trained neural network ML. The trained artificial neural network ML is operative to infer a surface defect size (e.g., on the inner ring, the outer ring, or the rolling element) based on the input frequencies and/or their amplitude values.

Figure 6:
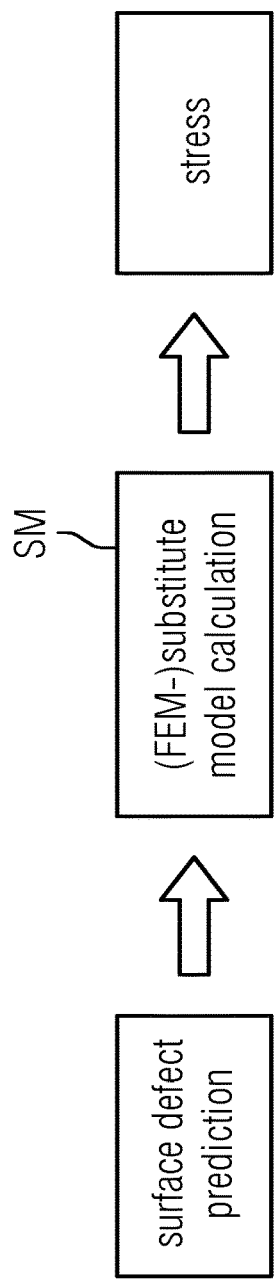
FIG. 6 shows a schematic illustration of exemplary steps for determining a bearing stress.

In FIG. 6, a schematic illustration of exemplary steps for determining a bearing stress is shown. Based on the surface defect size as, for example, determined according to the embodiment of FIG. 5, a bearing stress may be determined. This may be achieved by a finite element method or as shown in FIG. 6 by a substitute model of the finite element method. The substitute model may be a polynomial of degree 5 and may be obtained from the simulation model of the bearing:

$$\sigma = \sum_{k=0}^{n} x^k a_k$$

where $x_k$ denotes input parameters (e.g., defect size, (rotor) speed, and/or stress), and $a_k$ denotes corresponding coefficients. The coefficients $a_k$ of the polynomial may be determined by polynomial interpolation of the stress calculated by the bearing simulation as a function of the input parameters.

The calculation with the finite element method (FEM) hence may be replaced by a simplified substitute model that describes the stress with sufficient precision. As a result, the principal stresses caused by the surface defect are obtained.

Instead of the principal stresses, the substitute model may serve to obtain the contact force caused by the surface defect. The contact force or load may be determined based on the geometry and contact stress of bearing. In that case, the contact force F or load P may also be modelled by a polynomial of degree 5:

$$P = \sum_{k=0}^{n} x^k a_k$$

where $x_k$ denotes input parameters (e.g., defect size, (rotor) speed, and/or stress), and $a_k$ denotes corresponding coefficients, as in the above. The coefficients $a_k$ of the polynomial may be determined by polynomial interpolation of the contact force calculated by the bearing simulation as a function of the input parameters.

Figure 7:
FIG. 7 shows a first schematic illustration of exemplary steps for determining the remaining useful life of a bearing.

Turning to FIG. 7, exemplary method acts for determining the remaining useful life of the bearing are shown. The principal stress or the contact force as determined in accordance with the previous embodiments may be used as input for a calculation that yields a RUL as a result. The RUL calculation may be performed according to a high cycle fatigue (HCF) model.

Figure 8:
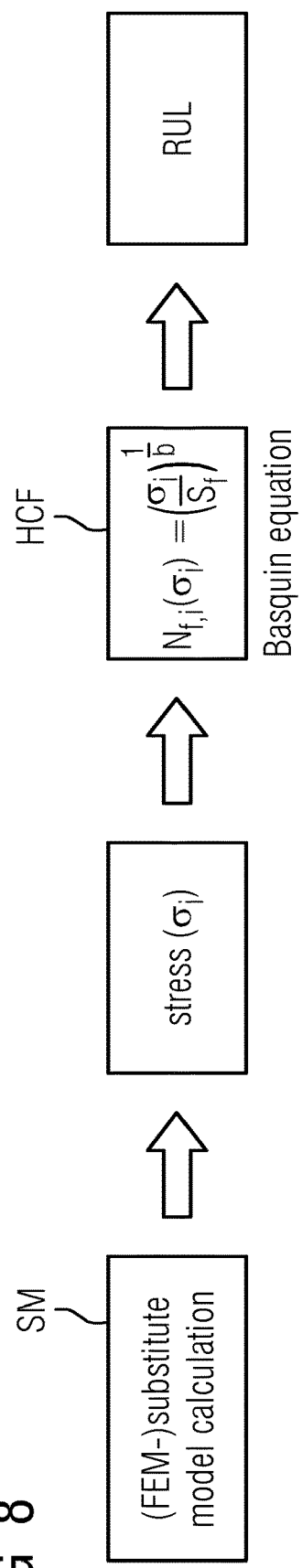
FIG. 8 shows a second schematic illustration of exemplary acts for determining the remaining useful life of a bearing.
Figure 9:
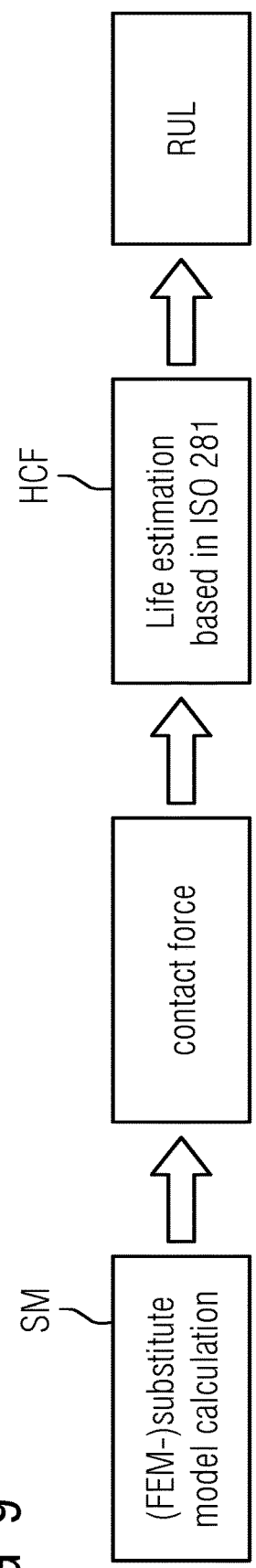
FIG. 9 shows a third schematic illustration of exemplary acts for determining the remaining useful life of a bearing.

In FIG. 8, further details for determining the remaining useful life of a bearing are shown. Based on calculations according to the substitute model SM, the principal stresses caused by the surface defect may be determined. Then, in order to determine the HCF effects of the surface defect Basquin's equation may be used. Basquin's equation is a power law relationship that describes the linear relationship between the applied stress cycles (S) and the number of cycles (N) to failure:

$$N_{f,i}(\sigma_i) = \left(\frac{\sigma_i}{S_f}\right)^{\frac{1}{b}}$$

Hence, the RUL as a number of cycles to failure may be obtained.

$$L_{10} = \left(\frac{C}{P}\right)^p$$

or $$L_{10h} = \frac{10^6}{60 \cdot n} \cdot L_{10}$$

where C is the dynamic load rating, P is the equivalent dynamic load, and p is the p life time exponential, and where p=3 for ball bearings and p=10/3 for roller bearings.

Hence, a machine learning model for the calculation of a defect size and a substitute model for calculating the principal stresses based on the defect size, and/or based on the catalog data and the operating conditions of the rotary machinery systems (e.g., a motor) is disclosed by the embodiments as described in the above.

Figure 10:
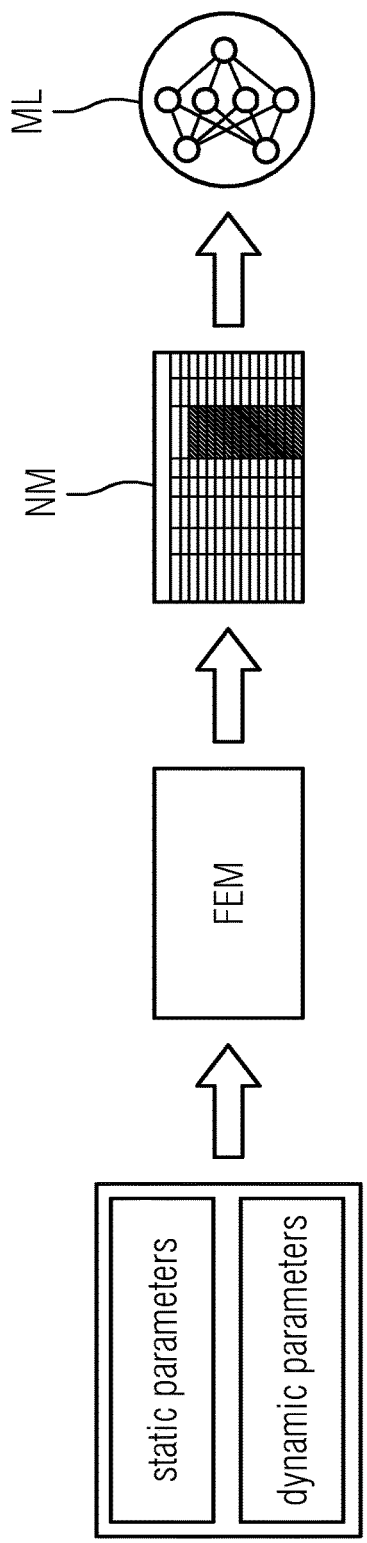
FIG. 10 shows a schematic illustration of exemplary acts for training an artificial neural network.

FIG. 10 shows a schematic illustration of exemplary acts for training an artificial neural network. First, in order to arrive at a suitable training data set, a finite element method FEM is used. Based on the FEM, a data set including vibration frequencies and corresponding amplitudes and surface defect sizes is obtained. Thereby, a data set is obtained that connects the vibration frequencies of surface defects, such as ball pass frequency of the outer ring or inner ring, with different surface defect sizes. This data set may be used to train an artificial neural network ML. This trained artificial neural network ML may then be used for determining the surface defect size. Accordingly, the trained artificial neural network ML may be used to determined principal stresses and/or the remaining useful life of the bearing as described in the above.

Now, in order to generate the data set, the FEM calculation may be based on input parameters such as static input parameters and dynamic input parameters. The static input parameters may include the geometry, material properties, and weight of the bearing, whereas the dynamic properties, which are varied while the static properties remain the same, may include different surface defect sizes and/or different rotor speeds. Thus, the FEM calculation yields vibration frequencies and corresponding amplitudes dependent on different surface defect sizes.

Figure 11:
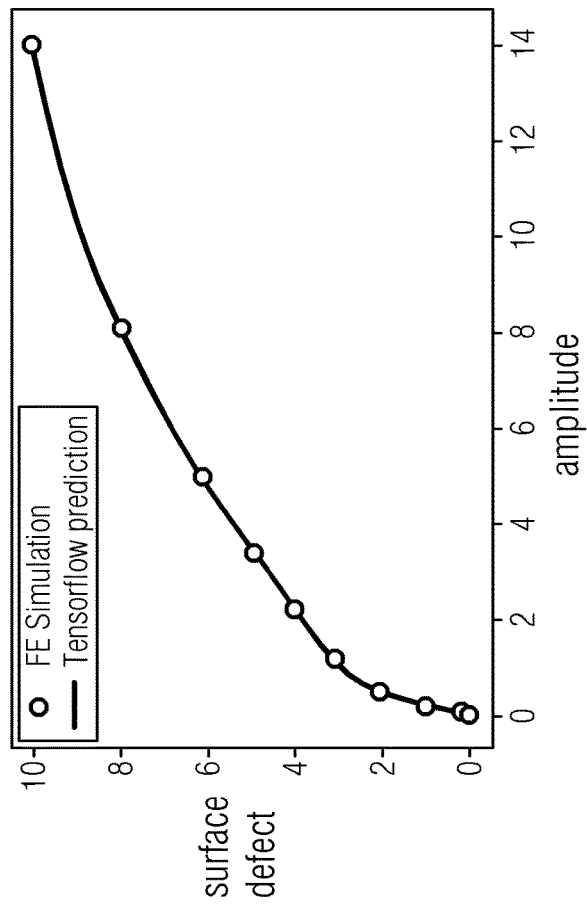
FIG. 11 shows a schematic illustration of frequency amplitudes and surface defect sizes.

FIG. 11 shows a schematic illustration of frequency amplitudes and surface defect sizes. In order to validate the inference capabilities of the trained artificial neural network ML, the surface defect size inferred by the artificial neural network as a function of the amplitude of a certain vibration frequency has been cross checked with the results of a simulation model of the bearing for the same frequency.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining a remaining useful life of a bearing having a surface defect, the method comprising:
   determining a defect size of the surface defect based on sampled oscillations of the bearing, wherein determining the defect size of the surface defect comprises determining the defect size of the surface defect based on associating, using a trained machine learning model, the sampled oscillations of the bearing with the defect size of the surface defect;
   determining, based on the defect size, at least one of principal stresses or a contact force of the bearing caused by the surface defect, wherein the determining of the at least one of the principal stresses or the contact force is based on a substitute model of the bearing, wherein the defect size of the surface defect is an input of the substitute model, and wherein the substitute model associates the defect size with a principal stress of the at least one of the principal stresses or the contact force; and
   determining the remaining useful life of the bearing based on at least one of the principal stresses, the contact force, or the at least one of the principal stresses and the contact force.

2. The method of claim 1, wherein the determining of the remaining useful life of the bearing is based on a maximum principal stress.

3. The method of claim 1, wherein the determining of the remaining useful life of the bearing is based on a high-cycle-fatigue model.

4. The method of claim 1, further comprising:
   loading the substitute model of the bearing,
   wherein one or more parameters of the substitute model are based on operational conditions of the bearing, model specific bearing data, or a combination thereof.

5. The method of claim 1, wherein the remaining useful life is determined based on a high-cycle-fatigue model,
   wherein the at least one of the principal stresses is an input for the high-cycle-fatigue model, and
   wherein a cycle count and material degradation are parameters of the high-cycle-fatigue model.

6. The method of claim 1, wherein determining the defect size of the surface defect based on the sampled oscillations of the bearing comprises determining the defect size of the surface defect based on sampled harmonic oscillations of an inner ring, an outer ring, or the inner ring and the outer ring of the bearing.

7. A system configured to determine a remaining useful life of a bearing having a surface defect, the system comprising:
   an apparatus comprising:
      a processor,
      a trained machine learning model and a substitute model of the bearing; and
      a sensor operable to measure oscillations of a bearing,
   wherein the processor is configured to:
      determine a defect size of the surface defect based on sampled oscillations of the bearing, wherein the determination of the defect size of the surface defect comprises determination of the defect size of the surface defect based on association, using the trained machine learning model, the sampled oscillations of the bearing with the defect size of the surface defect;
      determine, based on the defect size, at least one of principal stresses or a contact force of the bearing caused by the surface defect, wherein the determination of the at least one of the principal stresses or the contact force is based on the substitute model of the bearing, wherein the defect size of the surface defect is an input of the substitute model, and wherein the substitute model associates the defect size with a principal stress of the at least one of the principal stresses or the contact force; and
      determine the remaining useful life of the bearing based on at least one of the principal stresses, the contact force, or the at least one of the principal stresses and the contact force.

8. In a non-transitory computer-readable storage medium that stores instructions executable by one or more processors to determine a remaining useful life of a bearing having a surface defect, the instructions comprising:
   determining a defect size of the surface defect based on sampled oscillations of the bearing, wherein determining the defect size of the surface defect comprises determining the defect size of the surface defect based on associating, using a trained machine learning model, the sampled oscillations of the bearing with a defect size of the surface defect;

determining, based on the defect size, at least one of principal stresses or a contact force of the bearing caused by the surface defect, wherein the determining of the at least one of the principal stresses or the contact force is based on a substitute model of the bearing, wherein the defect size of the surface defect is an input of the substitute model, and wherein the substitute model associates the defect size with a principal stress of the at least one of the principal stresses or the contact force; and determining the remaining useful life of the bearing based on at least one of the principal stresses, the contact force, or the at least one of the principal stresses and the contact force.

9. The non-transitory computer-readable storage medium of claim 8, wherein the determining of the remaining useful life of the bearing is based on a maximum principal stress.

10. The non-transitory computer-readable storage medium of claim 8, wherein the determining of the remaining useful life of the bearing is based on a high-cycle-fatigue model.

11. The non-transitory computer-readable storage medium of claim 8, wherein the instructions further comprise:

loading the substitute model of the bearing, wherein one or more parameters of the substitute model are based on operational conditions of the bearing, model specific bearing data, or a combination thereof.

12. The non-transitory computer-readable storage medium of claim 8, wherein the remaining useful life is determined based on a high-cycle-fatigue model, wherein the at least one of the principal stresses is an input for the high-cycle-fatigue model, and wherein a cycle count and material degradation are parameters of the high-cycle-fatigue model.

\* \* \* \* \*